United States Patent
Sloan et al.

(10) Patent No.: US 9,568,356 B2
(45) Date of Patent: *Feb. 14, 2017

(54) SENSOR HAVING A ROTATABLE ENCLOSURE

(71) Applicant: Lutron Electronics Co., Inc., Coopersburg, PA (US)

(72) Inventors: Greg Edward Sloan, Allentown, PA (US); Fabian Brugger, Hoboken, NJ (US); Jeffrey A. Kessler, San Francisco, CA (US)

(73) Assignee: Lutron Electronics Co., Inc, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/540,357

(22) Filed: Nov. 13, 2014

(65) Prior Publication Data

US 2015/0069221 A1    Mar. 12, 2015

Related U.S. Application Data

(63) Continuation of application No. 12/957,443, filed on Dec. 1, 2010, now Pat. No. 8,917,024.
(Continued)

(51) Int. Cl.
*G01J 1/02* (2006.01)
*G01J 1/42* (2006.01)
(Continued)

(52) U.S. Cl.
CPC .............. *G01J 1/0271* (2013.01); *G01J 1/02* (2013.01); *G01J 1/4204* (2013.01); *G01J 1/44* (2013.01); *G01J 1/0448* (2013.01)

(58) Field of Classification Search
CPC .......... G01J 1/0271; G01J 1/44; G01J 1/4204; G01J 1/0266; G01J 1/0448; G01J 1/0466; H05B 31/04; H05B 33/0854; H05B 33/0872
(Continued)

(56) References Cited

U.S. PATENT DOCUMENTS 4,023,035 A    5/1977  Rodriguez
4,074,341 A *  2/1978  Niederost ............ G08B 17/113
                                                    340/629
(Continued)

OTHER PUBLICATIONS

Kidde, Wireless Smoke Alarm User's Guide, 2005, 19 pages.

*Primary Examiner* — Jimmy Vu
*Assistant Examiner* — Henry Luong
(74) *Attorney, Agent, or Firm* — Mark E. Rose; Philip N. Smith

(57) ABSTRACT

A sensor adapted to be mounted to a surface has a rotatable enclosure that may be used, for example, to direct a lens of the sensor towards a window. The daylight sensor includes a photosensitive circuit for measuring a light intensity in the space, a cover portion, and a base portion adapted to be mounted to the surface. The cover portion is rotatable with respect to the base portion, for example, to direct the lens towards the window after the base portion is mounted to the surface. The base portion may also include a cylindrical wall having a channel adapted to capture a snap of the cover portion, such that the snap may move angularly through the channel to allow for rotation of the cover portion with respect to the base portion to a plurality of discrete positions.

18 Claims, 7 Drawing Sheets

Related U.S. Application Data

(60) Provisional application No. 61/285,691, filed on Dec. 11, 2009.

(51) Int. Cl.
  *G01J 1/44*  (2006.01)
  *G01J 1/04*  (2006.01)

(58) Field of Classification Search
  USPC ........... 250/236, 239, 214 AL, 498.1, 497.1,
        250/503.1; 362/362, 632; 315/149–159
  See application file for complete search history.

(56) References Cited

U.S. PATENT DOCUMENTS

| | | |
|---|---|---|
| 4,768,020 A | 8/1988 | Chen |
| 5,258,899 A | 11/1993 | Chen |
| 5,381,323 A | 1/1995 | Osteen et al. |
| 5,442,532 A | 8/1995 | Boulos et al. |
| 5,590,953 A | 1/1997 | Haslam et al. |
| 5,649,761 A | 7/1997 | Sandell et al. |
| 5,744,913 A | 4/1998 | Martich et al. |
| 5,757,004 A | 5/1998 | Sandell et al. |
| 6,091,200 A | 7/2000 | Lenz |
| 6,098,943 A | 8/2000 | Howard et al. |
| 6,160,487 A | 12/2000 | DeLuca |
| 6,323,488 B1 | 11/2001 | McCavit et al. |
| 6,479,823 B1 | 11/2002 | Strang et al. |
| 6,583,573 B2 | 6/2003 | Bierman |
| 6,781,129 B2 | 8/2004 | Leen |
| 6,943,687 B2 | 9/2005 | Lee et al. |
| 6,948,831 B1 | 9/2005 | Naqvi |
| 7,175,315 B2 | 2/2007 | Eaton |
| 7,234,841 B2 | 6/2007 | Nash |
| 7,364,329 B2 | 4/2008 | Murray et al. |
| 7,375,313 B2 | 5/2008 | Lee et al. |
| 7,438,438 B2 | 10/2008 | Sandell |
| 7,490,960 B1 | 2/2009 | Fiorino et al. |
| 7,543,958 B2 | 6/2009 | Chi et al. |
| 7,635,846 B2 | 12/2009 | Chi et al. |
| 7,800,049 B2 | 9/2010 | Bandringa et al. |
| 8,917,024 B2 | 12/2014 | Sloan et al. |
| 2006/0091822 A1 | 5/2006 | Bierman et al. |
| 2009/0088021 A1* | 4/2009 | Kauffman ................. G01J 1/02 439/552 |
| 2009/0141499 A1 | 6/2009 | Fabbri et al. |
| 2010/0052574 A1 | 3/2010 | Blakeley et al. |
| 2010/0052576 A1* | 3/2010 | Steiner ............... H05B 37/0227 315/361 |
| 2010/0052894 A1 | 3/2010 | Steiner et al. |
| 2010/0073172 A1 | 3/2010 | Lax |
| 2010/0244706 A1 | 9/2010 | Steiner et al. |
| 2010/0244709 A1 | 9/2010 | Steiner et al. |

* cited by examiner

SENSOR HAVING A ROTATABLE ENCLOSURE

CROSS-REFERENCE TO RELATED APPLICATIONS

This application is a continuation application of commonly-assigned U.S. patent application Ser. No. 12/957,443, filed Dec. 1, 2010, now U.S. Pat. No. 8,917,024, issued Dec. 23, 2014, entitled DAYLIGHT SENSOR HAVING A ROTATABLE ENCLOSURE, which is a non-provisional application of U.S. Provisional Application Ser. No. 61/285,691, filed Dec. 11, 2009, entitled DAYLIGHT SENSOR HAVING A ROTATABLE ENCLOSURE, the entire disclosure of which is hereby incorporated by reference.

BACKGROUND OF THE INVENTION

Field of the Invention

The present invention relates to daylight sensors for determining the ambient (i.e., total) light level in a space, and more particularly, to a daylight sensor having a rotatable enclosure for easily directing a lens of the daylight sensor towards a window.

Description of the Related Art

Many rooms in both residential and commercial buildings are illuminated by both artificial light from a lighting load, such as an incandescent lamp or a fluorescent lamp, and daylight (i.e., sunlight) shining through a window. Daylight sensors (i.e., photosensors) are often used to measure the total light level in a space in order to adjust the light intensity of the lighting load to thus adjust the total light level in the space. For example, the light intensity of the lighting load may be decreased as the daylight level increases (and vice versa), so as to maintain the total light level in the space approximately constant. A daylight sensor typically comprises a lens for directing the light in the space towards an internal photodetector (such as a photodiode) for measuring the total light level in the space. Daylight sensors are typically mounted to a ceiling in the space at a distance from the window. The lens of the daylight sensor must be positioned such that the field of view of the daylight sensor is directed towards the window. Therefore, there is a need for a daylight sensor that may easily be mounted such that the lens is directed towards a window in a space.

SUMMARY OF THE INVENTION

As described herein, a sensor adapted to be mounted to a surface may comprise a rotatable enclosure for directing, for example, a lens of the sensor towards a window. The sensor may further comprise a photosensitive circuit for measuring a light intensity, a cover portion, and a base portion adapted to be mounted to the surface. The base portion may have a rear surface and a cylindrical wall configured to be connected to the rear surface. The wall may have a channel located adjacent to the rear surface and formed by a plurality of tabs on the cylindrical wall surrounding a circumference of the base portion with gaps formed between the tabs. The cover portion may be configured to be connected to the base portion and may comprise at least one snap captured in the channel and configured to move angularly through the channel to allow for rotation of the cover portion with respect to the base portion. The sensor may further comprise a post configured to be received in at least one of a plurality of detents, which are configured to hold the post to maintain the cover portion in position and to allow for rotation of the cover portion to a plurality of discrete positions. The post may extend perpendicularly towards the base portion. The detents may be formed in each of the tabs of the base portion. The cover portion may be rotatable with respect to the base portion, for example, to allow the lens to be directed towards the window after the base portion is mounted to the surface.

Other features and advantages of the present invention will become apparent from the following description of the invention that refers to the accompanying drawings.

DETAILED DESCRIPTION OF THE INVENTION

Figure 1:
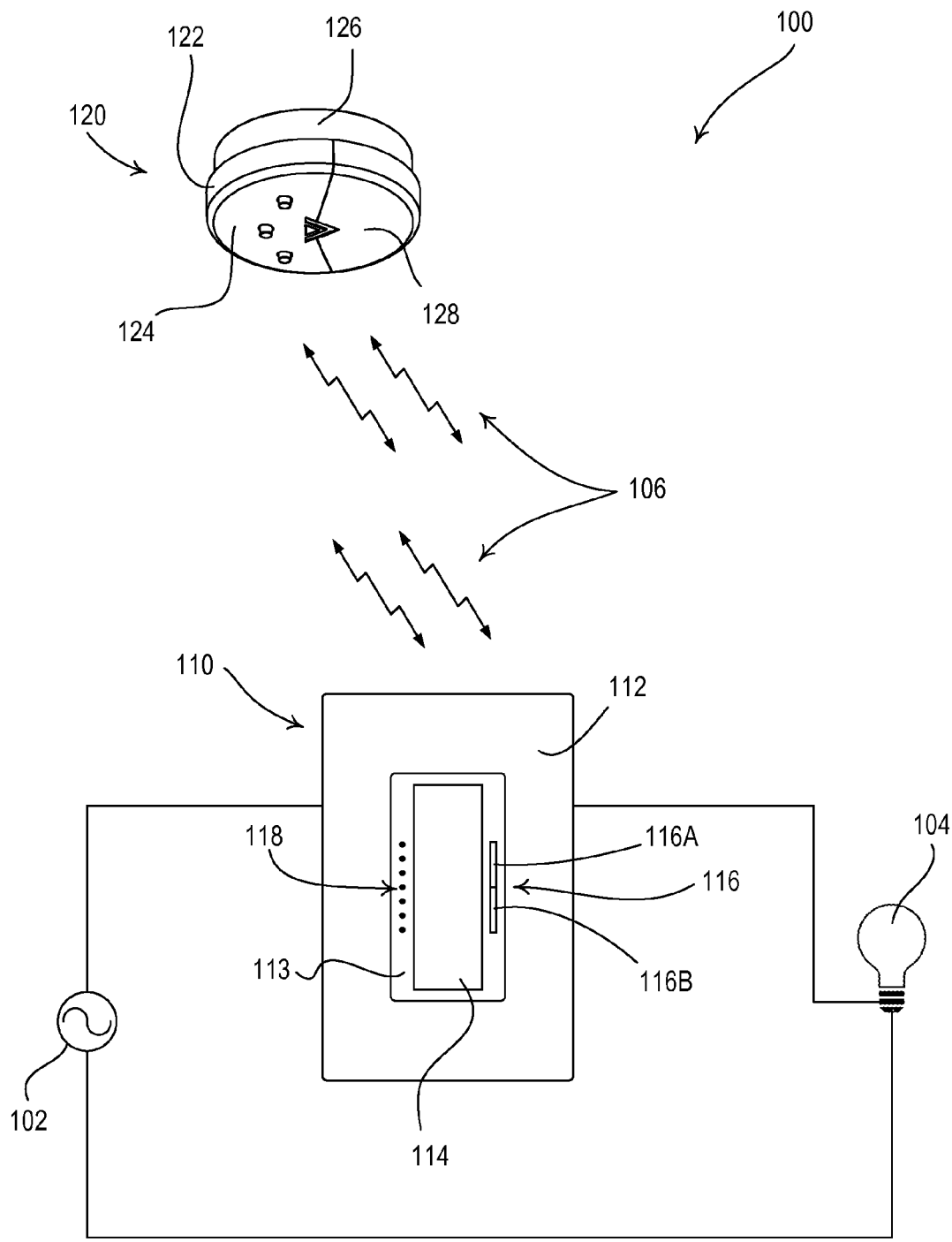
FIG. 1 is a simple diagram of a radio-frequency (RF) lighting control system comprising a dimmer switch and a daylight sensor.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simple diagram of a radio-frequency (RF) lighting control system 100 comprising a dimmer switch 110 and a daylight sensor 120. The dimmer switch 110 is adapted to be coupled in series electrical connection between an alternating-current (AC) power source 102 and a lighting load 104 for controlling the amount of power delivered to the lighting load. The dimmer switch 110 may be wall-mounted in a standard electrical wallbox. Alternatively, the dimmer switch 110 could be implemented as a table-top load control device. The dimmer switch 110 comprises a faceplate 112 and a bezel 113 received in an opening of the faceplate. The dimmer switch 110 further comprises a control actuator 114 and an intensity adjustment actuator 116. Actuations of the control actuator 114 toggle, i.e., turn off and on, the lighting load 104. Actuations of an upper portion 116A or a lower portion 116B of the intensity adjustment actuator 116 respectively increase or decrease the amount of power delivered to the lighting load 104 and thus increase or decrease the intensity of the lighting load 104 from a minimum intensity (e.g., 1%) to a maximum intensity (e.g., 100%). A plurality of visual indicators 118, e.g., light-emitting diodes (LEDs), are arranged in a linear array on the left side of the bezel 113. The visual indicators 118 are illuminated to provide feedback of the intensity of the lighting load 104. An example of a dimmer switch is described in greater detail in U.S. Pat. No. 5,248,919, issued Sep. 29, 1993, entitled LIGHTING CONTROL DEVICE, the entire disclosure of which is hereby incorporated by reference. Alternatively, the lighting control system 100 could simply comprise an electronic switch for toggling the lighting load 104 on and off (rather than the dimmer switch 110).

The daylight sensor 120 is mounted such that the daylight sensor is operable to measure a total light level $L_{TOT}$ in the vicinity of (i.e., a space around) the lighting load 104 controlled by the dimmer switch 110. The daylight sensor 120 includes an internal photosensitive circuit, e.g., a photosensitive diode 125 (FIG. 5), which is housed in an enclosure 122 having a cover portion 124 and a base portion 126. The enclosure 122 comprises a lens 128, which is provided in a front surface of the cover portion 124 and conducts light from outside the daylight sensor towards the internal photosensitive diode 125. The daylight sensor 120 is responsive to the total light intensity $L_{TOT}$ measured by the internal photosensitive diode 125. Specifically, the daylight sensor 120 wirelessly transmits digital messages to the dimmer switch 110 via RF signals 106 in response to the total light intensity $L_{TOT}$, such that the dimmer switch 110 controls the intensity of the lighting load 104 (and thus the total lighting intensity $L_{TOT}$ in the space around the lighting load).

During a setup procedure of the RF lighting control system 100, the dimmer switch 110 may be assigned to (i.e., associated with) the daylight sensor 120. The daylight sensor 120 transmits digital messages wirelessly via the RF signals 106 to the dimmer switch 110 in response to the total lighting intensity $L_{TOT}$ in the space. A digital message transmitted by the daylight sensor 120 includes, for example, identifying information, such as, a serial number (i.e., a unique identifier) associated with the daylight sensor. The dimmer switch 110 is responsive to messages containing the serial numbers of the daylight sensor 120 to which the dimmer switch is assigned. Each digital message may further comprise the measured total lighting intensity $L_{TOT}$ in the space. Accordingly, the dimmer switch 110 controls the intensity of the lighting load 104 to the new lighting intensity $L_{NEW}$ in response to receiving from the daylight sensor 120 a digital message with the measured total lighting intensity $L_{TOT}$ in the space. Alternatively, the digital messages could comprise a command, such as a specific new lighting intensity $L_{NEW}$ for the lighting load 104. The operation of the RF lighting control system 100 is described in greater detail in commonly-assigned U.S. patent application Ser. No. 12/727,956, filed Mar. 19, 2010, entitled WIRELESS BATTERY-POWERED DAYLIGHT SENSOR, the entire disclosure of which is hereby incorporated by reference.

Figure 2:
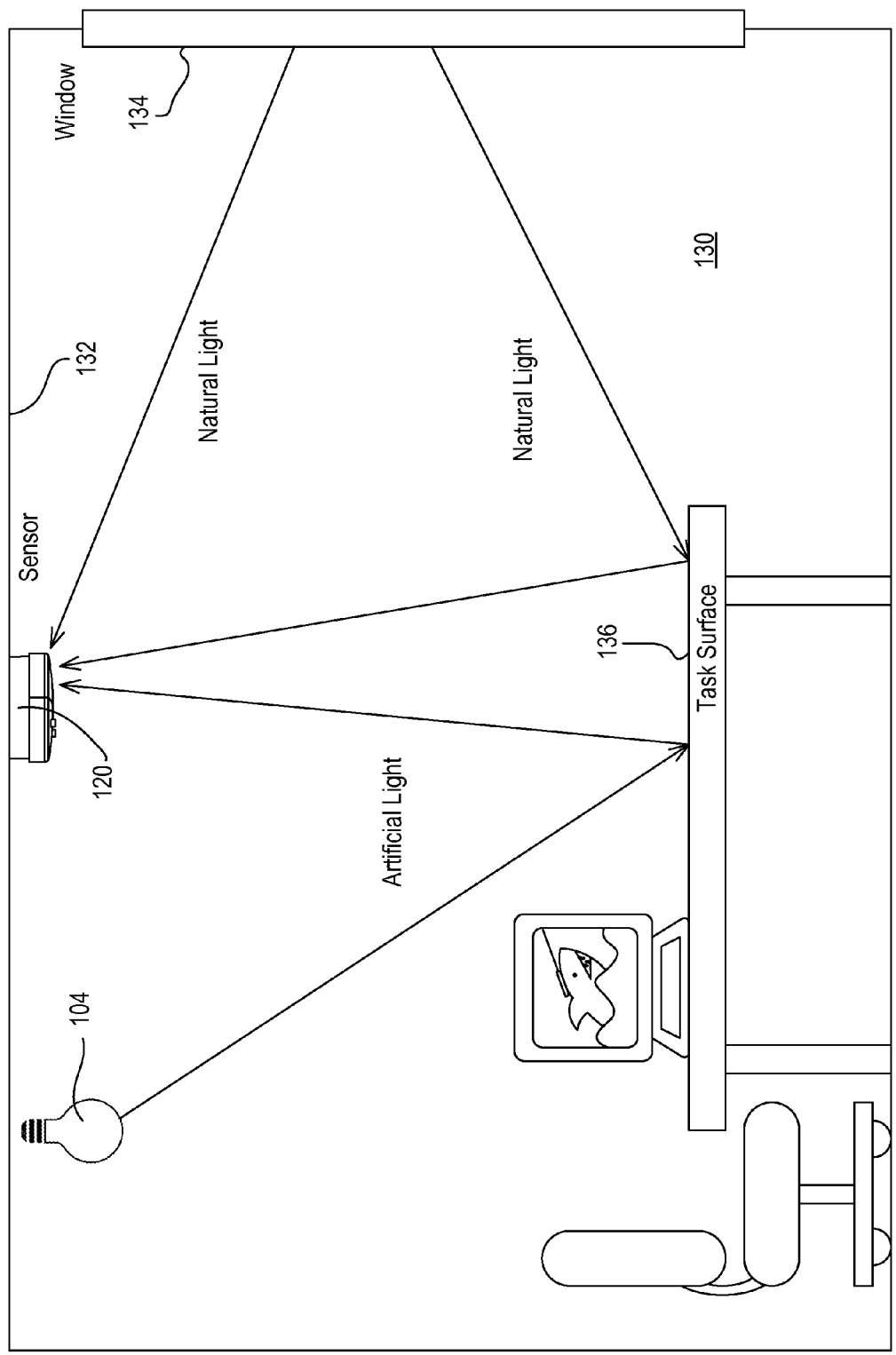
FIG. 2 is a simplified diagram of a room in which the daylight sensor of FIG. 1 may be mounted.

FIG. 2 is a simplified diagram of an example room 130 in which the daylight sensor 120 may be mounted. As shown in FIG. 2, the daylight sensor 120 is mounted to a ceiling 132 of the room 130 at a distance from a window 134 through which natural light (i.e., daylight) shines. In the example room 130 of FIG. 2, the lighting load 104 is also mounted to the ceiling 132 of the room 130, but may be mounted to other surfaces in the room. The room 130 also contains a task surface 136 (e.g., a table), which is illuminated by the natural light shining through the window 134 and the artificial light generated by the lighting load 104. The daylight sensor 120 is operable to measure the total light level $L_{TOT}$, which is a combination of the natural light and the artificial light in the room 130. The natural light and the artificial light that shine onto the task surface 136 are reflected to the daylight sensor 120. In addition, natural light from the window 134 may shine directly onto the daylight sensor 120. While not shown in FIG. 2, the room 130 may comprise additional windows on different walls (i.e., on different façades of the building, such as in a corner office). Accordingly, the lighting control system 100 may comprise multiple daylight sensors 120 facing the multiple windows in the space. The dimmer switch 110 could average the measured total lighting intensities $L_{TOT}$ received from the multiple daylight sensors 120 in order to control the lighting load 104.

According to the present invention, the enclosure 122 of the daylight sensor 120 comprises a rotatable enclosure, which allows the lens 128 to be easily directed towards the window 134 after the daylight sensor is mounted to the ceiling 132 (or other surface in the room 130), such that more natural light than artificial light shines through the lens 128 onto the internal photosensitive diode 125. In addition, since the enclosure 122 is rotatable, the lens 128 may be repositioned to be directed in a different direction, for example, after an adjustment to the layout of the furniture or walls in the room 130.

Since the light intensity of the reflected light shining on the daylight sensor 120 is less than the light intensity of the light shining directly on the task surface 136, the daylight sensor is characterized by a gain, which is representative of the difference between the light intensity at the daylight sensor and at the task surface and may be stored a memory or the dimmer switch. The dimmer switch 110 uses the gain to attempt to control the illuminance (i.e., the light intensity) on the task surface 136 to a desired light intensity $L_{SP}$ (i.e., a setpoint) in response to the measured total lighting intensity $L_{TOT}$ in the space (as transmitted by the daylight sensor 120). Alternatively, the gain could be stored in a memory of the daylight sensor 120, for example, if the digital messages transmitted by the daylight sensor comprise command for the dimmer switch 110 to control the lighting load 104 to new lighting intensities $L_{NEW}$. The gain may be set during a calibration procedure, an example of which is described in commonly-assigned U.S. patent application Ser. No. 12/727,923, filed Mar. 19, 2010, entitled METHOD OF CALIBRATING A DAYLIGHT SENSOR, the entire disclosure of which is hereby incorporated by reference.

Figure 3A:
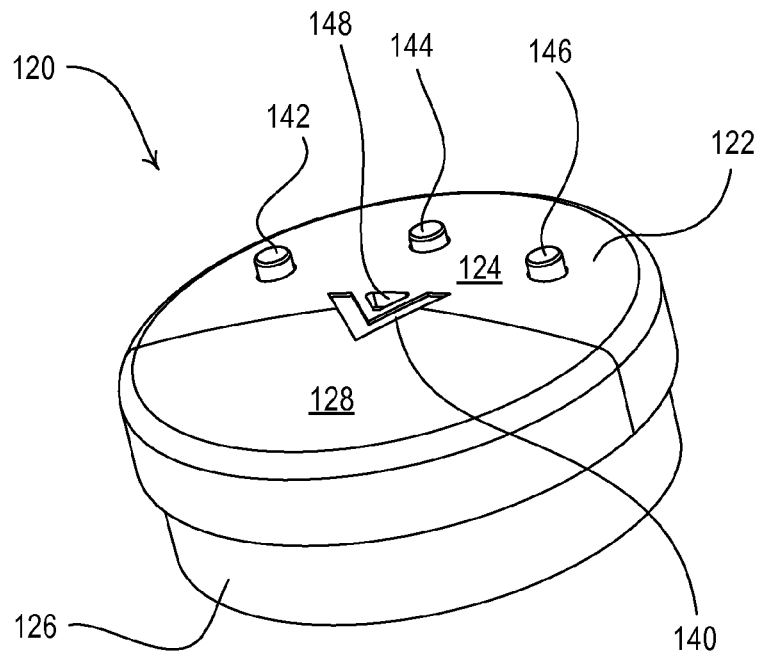
FIG. 3A is a perspective view of the daylight sensor of FIG. 1 showing a cover portion attached to a base portion of the daylight sensor.
Figure 3B:
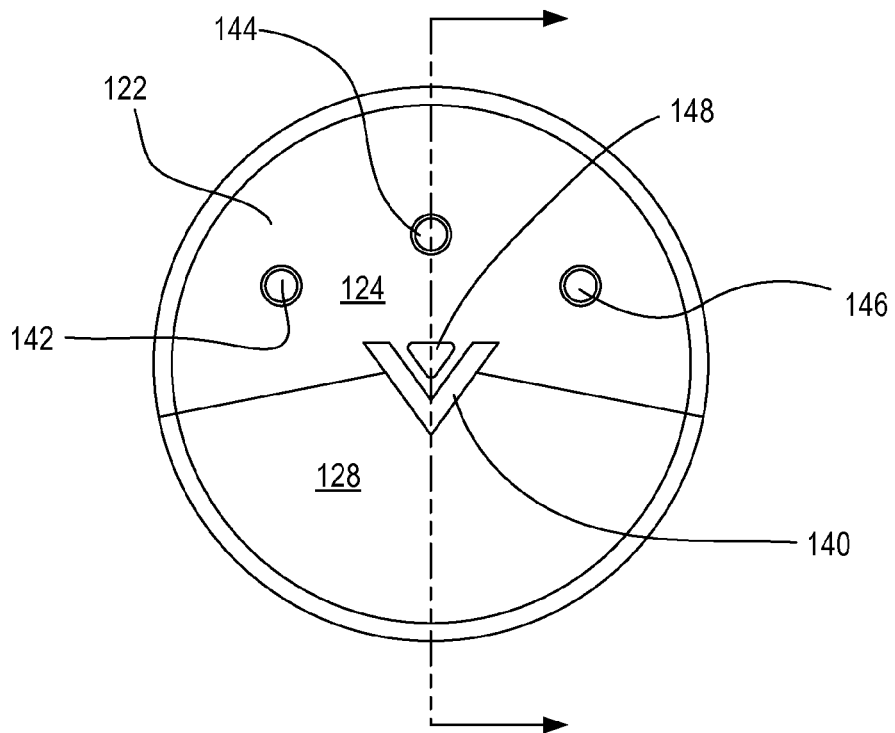
FIG. 3B is a front view of the daylight sensor of FIG. 3A.

FIG. 3A is a perspective view and FIG. 3B is a front view of the daylight sensor 120. The lens 128 is transparent such that the light from the room 130 is able to shine onto the internal photosensitive diode 125 of the daylight sensor 120. After the daylight sensor 120 is mounted to the ceiling 132, the enclosure 122 of the daylight sensor may be rotated such that an arrow 140 points towards (and the lens 128 is directed towards) the window 134. As a result, more natural light than artificial light will shine through the lens 128 and onto the internal photosensitive diode 125. A plurality of actuators (e.g., a calibration button 142, a test button 144, and a link button 146) are used during the setup and calibration procedures of the daylight sensor 120. The daylight sensor 120 further comprises a laser-pointer receiving opening 148, which is adapted to receive energy from a laser pointer (not shown). The daylight sensor 120 is responsive to the energy of the laser pointer shining through the laser-pointer receiving opening 148. When the daylight sensor 120 is mounted to the ceiling 132, a user may shine the laser pointer through the opening 148 rather than actuating the calibration button 142 during the calibration procedure.

Figure 4A:
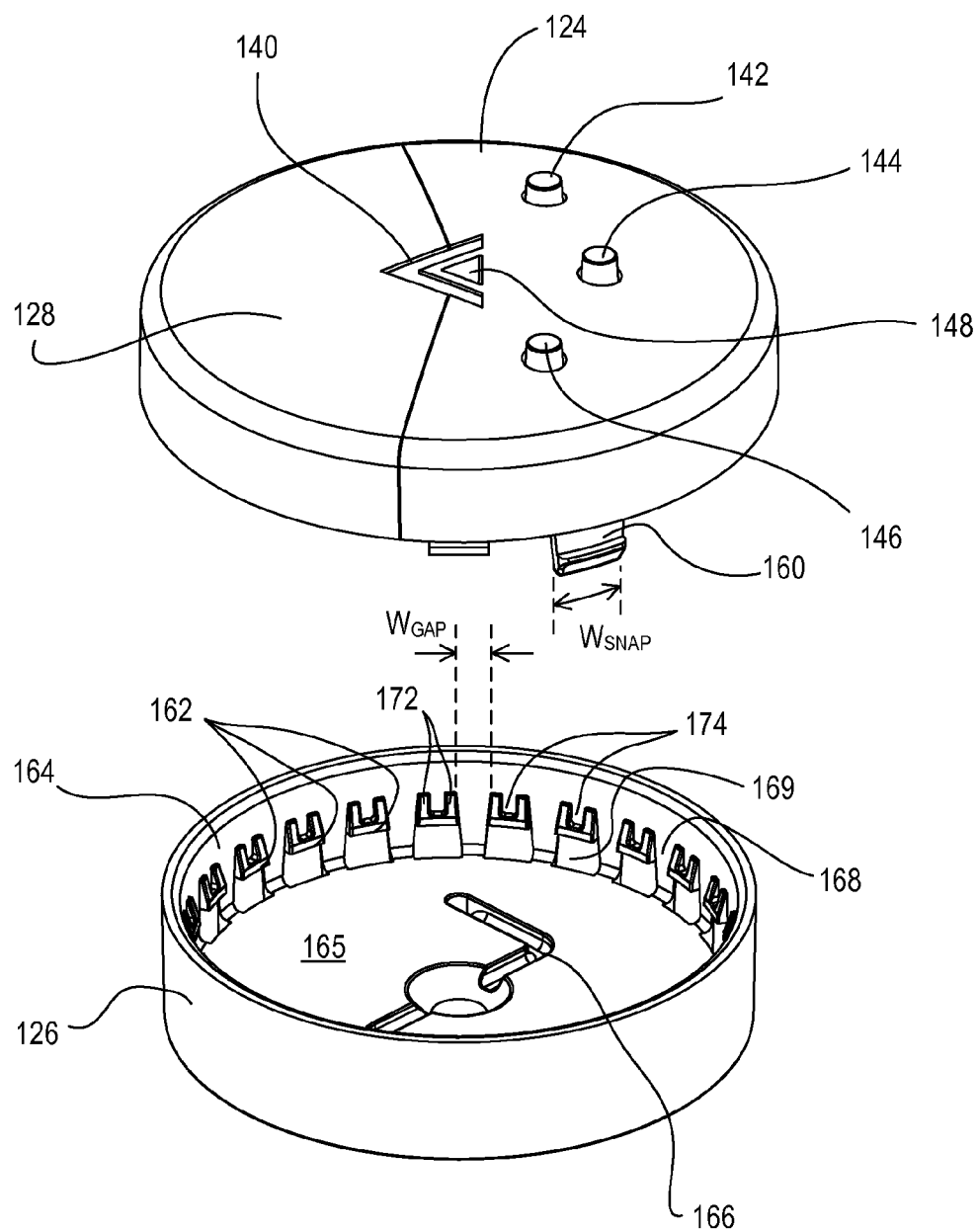
FIG. 4A is a top perspective view of the daylight sensor of FIG. 3A showing the cover portion detached from the base portion.
Figure 4B:
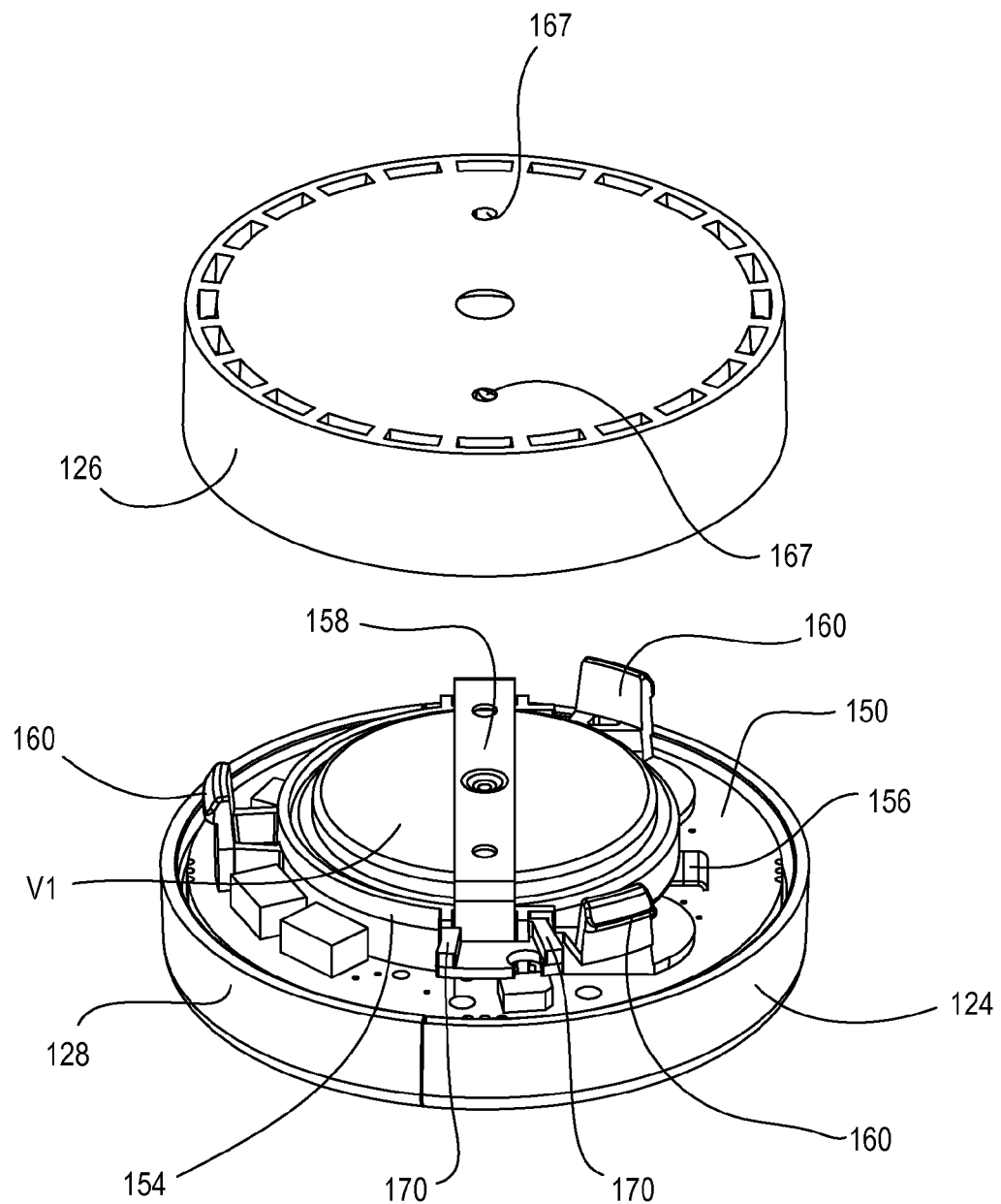
FIG. 4B is a bottom perspective view of the daylight sensor of FIG. 3A showing the cover portion detached from the base portion.
Figure 5:
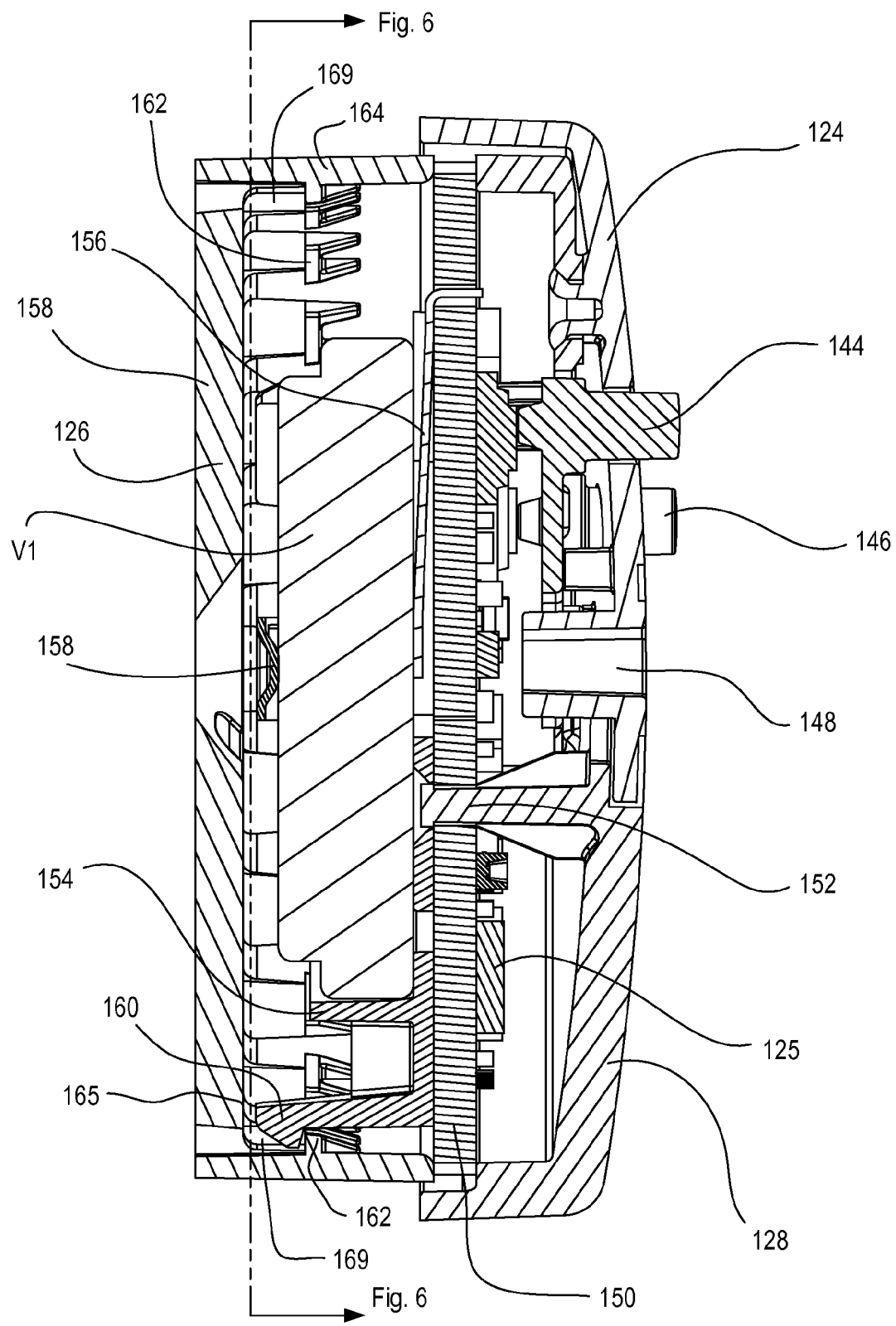
FIG. 5 is a left side cross-sectional view of the daylight sensor of FIG. 3A taken through the center of the daylight sensor with the cover portion attached to the base portion.
Figure 6:
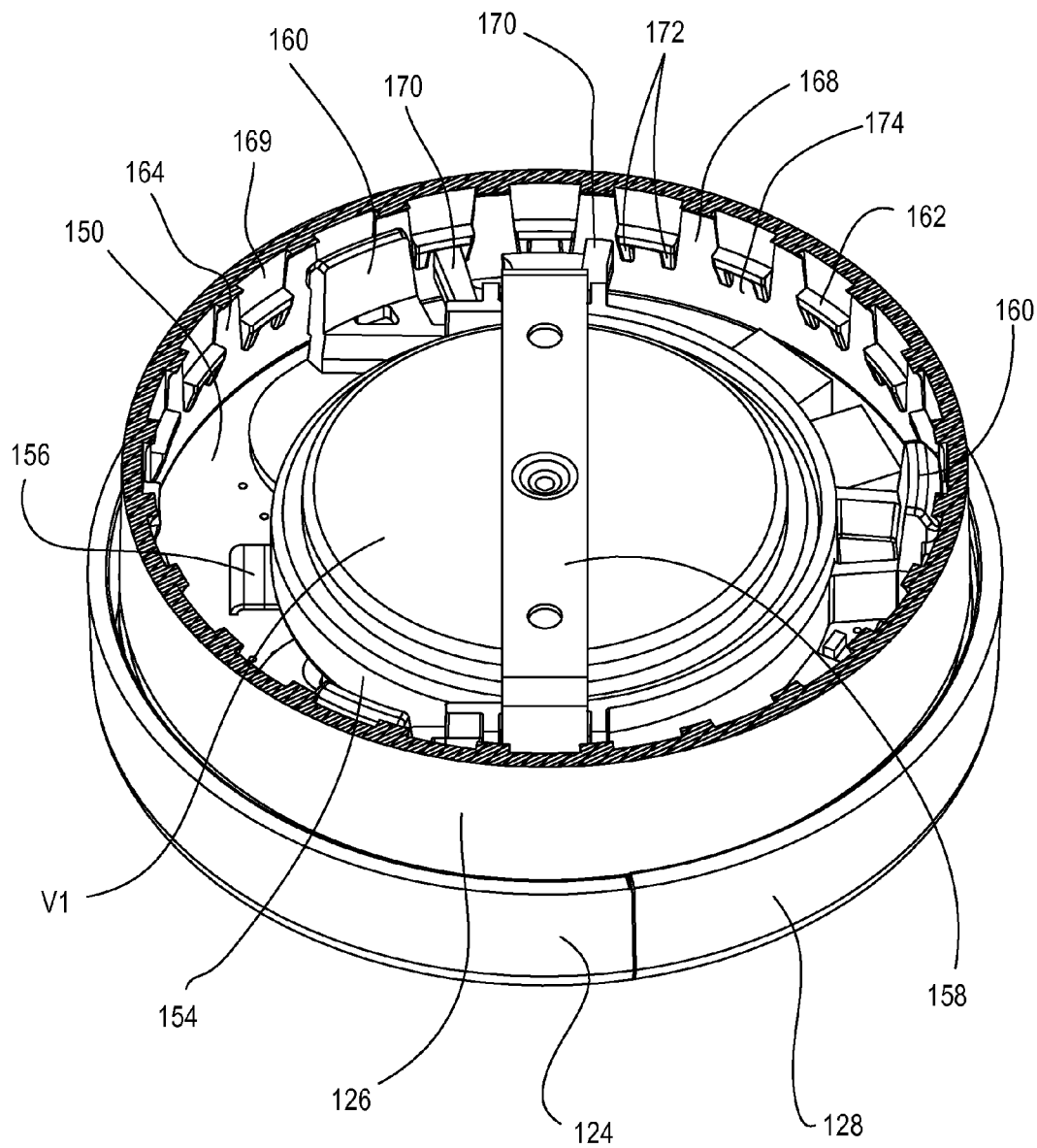
FIG. 6 is a rear perspective cross-sectional view of the daylight sensor of FIG. 3A with the cover portion attached to the base portion.

FIG. 4A is a top perspective view and FIG. 4B is a bottom perspective view of the daylight sensor 120 showing the cover portion 124 detached from the base portion 126. FIG. 5 is a left side cross-sectional view of the daylight sensor 120 taken through the center of the daylight sensor as shown in FIG. 3B. FIG. 6 is a rear perspective cross-sectional view of the daylight sensor 120 taken through the line shown in FIG. 5. The circuitry of the daylight sensor 120 is mounted on a printed circuit board (PCB) 150, which is connected to the cover portion 124, e.g., heat-staked via at least one stake 152 (FIG. 5). The daylight sensor 120 comprises a battery V1 for powering the circuitry of the daylight sensor 120. The circuitry of the daylight sensor 120 is described in greater detail in previously-referenced U.S. patent application Ser. No. 12/727,956.

The cover portion 124 is mechanically connected to a battery holder structure 154 for housing the battery V1. When received in the battery holder structure 154, the battery V1 is electrically connected to the PCB 150 via electrical contacts 156, 158. The battery holder structure 154 is mechanically connected to the cover portion 124. The battery holder structure 154 comprises snaps 160, which are adapted to be received by tabs 162 on a cylindrical wall 164 of the base portion 126 to couple the cover portion 124 to the base portion. The base portion 126 comprises a rear surface 165 that is connected to the cylindrical wall 164. The rear surface 165 has a groove 166 for receiving a mounting structure (not shown) that extends through openings in the rear surface 165 and allows the daylight sensor 120 to be releasably be attached to a mounting surface, such as a drop ceiling panel. An example of the mounting structure is described in greater detail in U.S. patent application Ser. No. 12/371,027, filed Feb. 13, 2009, entitled METHOD AND APPARATUS FOR CONFIGURING A WIRELESS SENSOR, the entire disclosure of which is hereby incorporated by reference. Alternatively, the daylight sensor 120 could be attached to the mounting surface using, for example, an adhesive (e.g., double-sided tape) or a screw received through a screw hole 167.

As previously mentioned, the enclosure 122 of the daylight sensor 120 comprises a rotatable enclosure. The tabs 162 surround the circumference of the base portion 126 with only small gaps 168 between adjacent tabs, such that a channel 169 is formed between the tabs and the rear surface 165 of the base portion. When the cover portion 124 is connected to the base portion 126, the snaps 160 are each captured in the channel 169 adjacent the rear surface 165 of the base portion. The width $W_{SNAP}$ of each snap 160 (i.e., in the angular direction as shown in FIG. 4A) is larger than the width $W_{GAP}$ of the gaps 168 between the adjacent tabs 162, such that the snaps are held in the channel 169. The snaps 160 are able to move angularly through the channel 169 formed between the tabs 162 and the rear surface 165, such that the cover portion 124 may be fully rotated (i.e., rotated 360°) with respect to the base portion 126. The height of each snap 160 is sized such that the snap fits securely between the tabs 162 and the rear surface 165 while still allowing the cover portion 124 to rotate. Thus, after the base portion 126 is attached to the mounting surface and the cover portion 124 is attached to the base portion, the cover portion may be rotated to direct the lens 128 towards the window 134. Alternatively, the tabs 162 could all be connected together (i.e., without the gaps 168 between the adjacent tabs).

The battery holder structure 154 further comprises two posts 170 that extend towards the cylindrical wall 164 of the base portion 126. The tabs 162 of the base portion 126 each have two parallel extensions 172 forming detents 174. The posts 170 of the battery holder structure 154 are received in the detents 174. The two posts 170 are located on the battery holder structure 154 with respect to each other such that one post is received in one of the detents 174 of the tabs 162 and the other post is received in one of the gaps 168 between the adjacent tabs 162 (when the cover portion 124 is not being rotated with respect to the base portion 126). The posts 170 and the detents 174 allow the cover portion 124 to be rotated to a plurality of discrete positions (rather than being continuously variable). The detents 174 are sized so as to firmly hold the received post 170 in place, such that the lens 128 of the daylight sensor 120 is maintained in position directed toward the window 134. The gaps 168 formed between the adjacent tabs 162 are larger than the size of the detents and do not function to hold the posts in place. Alternatively, the detents 174 could be provided in the battery holder structure 124 connected to the cover portion 124, and the posts 170 could extend inwardly from the cylindrical wall 164 of the base portion 126.

The cover portion 124 may be removed from the base portion 126 by simply pulling the cover portion away from the base portion. Removal of the cover portion 124 from the base portion 126 allows for replacement of the battery V1 in the battery holder structure 154. When the cover portion 124 is pulled away from the base portion 126, the snaps 160 of the battery holder structure 154 flex inwards (i.e., towards the battery V1) and move past the tabs 162, such that the snaps are no longer held in the channel 169. The cover portion 124 may be re-installed on the base portion 126 by forcing the cover portion towards the base portion, such that the snaps 160 are once again received in the channel 169.

The present invention has been described with reference to the daylight sensor 120 for measuring the total light level $L_{TOT}$ in the room 130. However, the concepts of the present invention can also be other types circular control devices, such as, for example, ceiling-mounted occupancy sensors, vacancy sensors, and temperature sensors. In addition, even though the present invention has been described with reference to the dimmer switch 110 for controlling the intensity of the lighting load 104, the concepts of the present invention could be applied to load control systems comprising other types of load control devices, such as, for example, electronic switches for toggling electrical loads on and off, electronic dimming ballasts for fluorescent loads, and drivers for light-emitting diodes (LEDs). Additionally, the concepts of the present invention could be used to control other types of electrical loads, such as, for example, fan motors or motorized window treatments. Examples of load control systems including other types of electrical loads, load control devices, and sensors are described in greater detail in U.S. patent application Ser. No. 12/845,016, filed Jul. 28, 2010, entitled LOAD CONTROL SYSTEM HAVING AN ENERGY SAVINGS MODE, the entire disclosure of which is hereby incorporated by reference.

Lighting control systems including wired daylight sensors (i.e., wired photosensors) are described in greater detail in U.S. Pat. No. 7,111,952, issued Sep. 26, 2006, entitled SYSTEM TO CONTROL DAYLIGHT AND ARTIFICIAL ILLUMINATION AND SUN GLARE IN A SPACE, and U.S. Pat. No. 7,369,060, issued May 6, 2008, entitled DISTRIBUTED INTELLIGENCE BALLAST SYSTEM AND EXTENDED LIGHTING CONTROL PROTOCOL, the entire disclosures of which are hereby incorporated by reference. Examples of other RF lighting control systems are described in greater detail in U.S. patent application Ser. No. 12/033,223, filed Feb. 19, 2008, entitled COMMUNICATION PROTOCOL FOR A RADIO-FREQUENCY LOAD CONTROL SYSTEM, and U.S. patent application Ser. No. 12/203,518, filed Sep. 3, 2008, entitled RADIO-FREQUENCY LIGHTING CONTROL SYSTEM WITH OCCUPANCY SENSING, the entire disclosures of which are hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sensor adapted to be mounted to a surface, the sensor comprising: a photosensitive circuit for measuring a light intensity; a base portion configured to be mounted to the surface, the base portion comprising a rear surface and a cylindrical wall configured to be connected to the rear surface, the wall having a channel located adjacent to the rear surface and formed by a plurality of tabs on the cylindrical wall surrounding a circumference of the base portion with gaps formed between the tabs; and a cover portion configured to be connected to the base portion, the cover portion comprising at least one snap captured in the channel and configured to move angularly through the channel to allow for rotation of the cover portion with respect to the base portion; wherein the cover portion comprises a post extending perpendicularly towards the cylindrical wall of the base portion, the post configured to be received in detents formed in the cylindrical wall of the base portion to allow for rotation of the cover portion with respect to the base portion to a plurality of discrete positions; and wherein the detents are formed in each of the tabs of the base portion.

2. The sensor of claim 1, wherein the cover portion comprises a second post extending towards the cylindrical wall of the base portion, the second post also configured to be received in the detents formed in each of the tabs of the base portion.

3. The sensor of claim 2, wherein, when one post is received in one of the detents, the other post is received in one of the gaps formed between the tabs.

4. The sensor of claim 1, wherein the detents are formed by two parallel extensions of the tabs on the cylindrical wall of the base portion.

5. The sensor of claim 1, wherein a width of the snap in the angular direction is larger than a width of the gaps between the tabs.

6. The sensor of claim 1, wherein the post is formed in a structure that is connected to the cover portion.

7. The sensor of claim 6, wherein the structure is configured to hold a battery of the sensor, and the photosensitive circuit is configured to be powered by the battery.

8. The sensor of claim 1, wherein the cover portion comprises a plurality of snaps configured to be received in the channel of the base portion.

9. The sensor of claim 1, wherein the cover portion has a lens configured to direct light towards the photosensitive circuit.

10. The sensor of claim 1, wherein the sensor is configured to wirelessly transmit digital messages in response to the light intensity measured by the photosensitive circuit.

11. A sensor adapted to be mounted to a surface, the sensor comprising:
a photosensitive circuit for measuring a light intensity;
a base portion configured to be mounted to the surface, the base portion comprising a rear surface and a cylindrical wall configured to be connected to the rear surface, the wall having a channel located adjacent to the rear surface and formed by a plurality of tabs on the cylindrical wall surrounding a circumference of the base portion with gaps formed between the tabs;
a cover portion configured to be connected to the base portion, the cover portion comprising at least one snap captured in the channel and configured to move angularly through the channel to allow for rotation of the cover portion with respect to the base portion; and
a post configured to be received in at least one of a plurality of detents, the detents configured to hold the post to maintain the cover portion in position and to allow for rotation of the cover portion to a plurality of discrete positions.

12. The sensor of claim 11, wherein the post is formed in the cover portion and extends perpendicularly towards the cylindrical wall of the base portion, the detents are formed in the cylindrical wall of the base portion.

13. The sensor of claim 12, wherein the post is formed in a structure that is connected to the cover portion, the structure configured to hold a battery of the sensor, the photosensitive circuit configured to be powered by the battery.

14. The sensor of claim 11, wherein the cover potion comprises a second post extending towards the cylindrical wall of the base portion, the second post also configured to be received in the detents of the base portion.

15. The sensor of claim 11, wherein the cover portion comprises a plurality of snaps configured to be received in the channel of the base portion.

16. The sensor of claim 11, wherein the cover portion has a lens configured to direct light towards the photosensitive circuit.

17. The sensor of claim 11, wherein the cover portion is configured to be fully rotated with respect to the base portion.

18. The sensor of claim 11, wherein the sensor is configured to wirelessly transmit digital messages in response to the light intensity measured by the photosensitive circuit.

* * * * *